United States Patent
Karlsson

(10) Patent No.: US 10,740,618 B1
(45) Date of Patent: Aug. 11, 2020

(54) TRACKING OBJECTS IN LIVE 360 VIDEO

(71) Applicant: Amazon Technologies, Inc., Seattle, WA (US)

(72) Inventor: Kent Haakan Karlsson, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 264 days.

(21) Appl. No.: 15/966,780

(22) Filed: Apr. 30, 2018

(51) Int. Cl.
| | |
|---|---|
| *G06K 9/00* | (2006.01) |
| *G10L 15/26* | (2006.01) |
| *H04N 21/44* | (2011.01) |
| *H04N 21/488* | (2011.01) |
| *H04N 21/4725* | (2011.01) |

(52) U.S. Cl.
CPC ..... *G06K 9/00718* (2013.01); *G06K 9/00671* (2013.01); *G10L 15/265* (2013.01); *H04N 21/44008* (2013.01); *H04N 21/4725* (2013.01); *H04N 21/4884* (2013.01)

(58) Field of Classification Search
CPC ............ G06K 9/00718; G06K 9/00671; G10L 15/265; H04N 21/44008; H04N 21/4725; H04N 21/4884
See application file for complete search history.

(56) References Cited

U.S. PATENT DOCUMENTS

| | | | | |
|---|---|---|---|---|
| 8,077,917 | B2* | 12/2011 | Forsgren | A63B 24/0021 382/103 |
| 8,311,277 | B2* | 11/2012 | Peleg | G11B 27/034 382/103 |
| 8,806,529 | B2* | 8/2014 | Miles | H04N 21/23439 725/32 |
| 9,264,475 | B2* | 2/2016 | Shivadas | H04L 65/605 |
| 2006/0206582 | A1* | 9/2006 | Finn | H04H 60/73 709/217 |
| 2010/0064324 | A1* | 3/2010 | Jenkin | H04N 21/443 725/59 |
| 2017/0127008 | A1* | 5/2017 | Kankaanpaa | G06K 9/00711 |

* cited by examiner

*Primary Examiner* — Shefali D Goradia
(74) *Attorney, Agent, or Firm* — Kilpatrick Townsend & Stockton LLP

(57) ABSTRACT

Techniques for identifying hot spots in a stream of content of an omnidirectional camera for subsequent tracking of the hot spot and presenting the view of the hot spot are described herein. A stream of content of a real space may be received where a frame of the stream content is associated with time information. Locations and identifications of objects within a particular frame of a plurality of frames of the stream of content may be determined based at least in part on an object detection algorithm. Metadata may be generated that includes the identified objects and the locations of the identified objects. The metadata may be interleaved into the stream of content prior to being presented to a user device. An updated view of the content may be presented that corresponds to tracking the object in subsequent frames of content captured by the camera of the real space.

20 Claims, 8 Drawing Sheets

TRACKING OBJECTS IN LIVE 360 VIDEO

BACKGROUND

Omnidirectional videos, also known as 360-degree videos, include video recordings where a view in multiple directions is captured at the same time. 360-degree videos provide users with an environment of immersion as they are able to view some of the multiple directions by providing input which is different from standard videos that only present a single view of content. Users can interact with the 360-degree videos by providing input which causes the view of the video to pan in one direction or another. However, the panning of the view presented to the user is usually limited to some set number of degrees. Moreover, the user is limited to still viewing only a single view of the multiple views captured by a 360-degree video on conventional hardware and thus may be unaware of other objects or events that are occurring in other views. Current hardware constraints and limited user knowledge of off-screen or out of view objects included in the 360-degree video can ruin the user immersion and cause unneeded frustration to the viewing experience.

BRIEF DESCRIPTION OF THE DRAWINGS

Various embodiments in accordance with the present disclosure will be described with reference to the drawings, in which.

DETAILED DESCRIPTION

Figure 1:
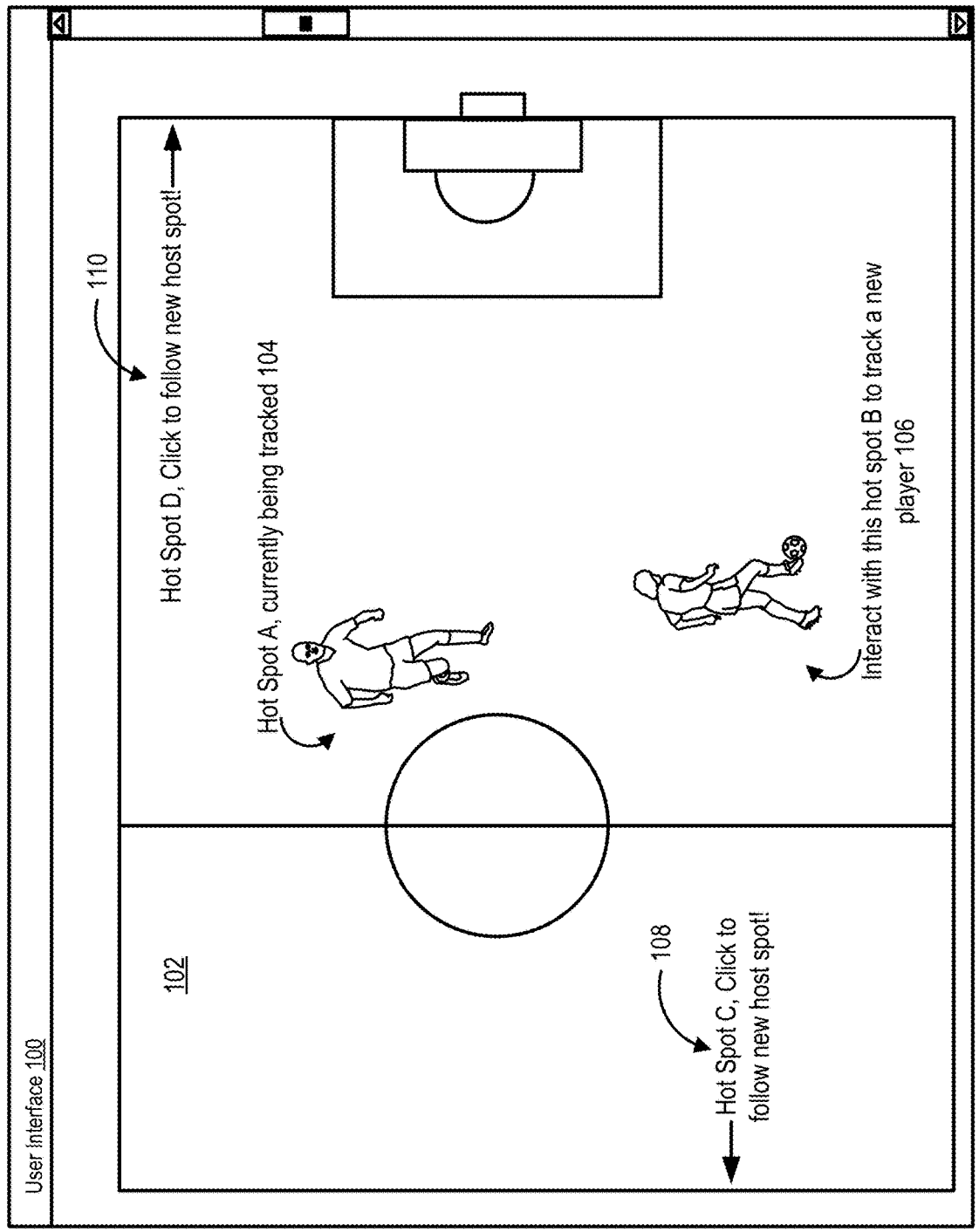
FIG. 1 illustrates an example user interface depicting several hot spots for an object identification feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for an object identification feature that can be applied to content that is captured by an omnidirectional camera (360-degree camera) to generate metadata that includes information about the identified object. More specifically, the metadata can be interleaved or combined into a conventional stream of content captured by the omnidirectional camera. In some examples, this can provide enhancements such as navigation to (e.g., on a screen) and tracking of an identified object (referred to as a hot spot) within the interleaved stream of content that is being presented to a user. To further illustrate, a user may provide input using conventional technologies (e.g., a conventional television set with a remote controller) that can be transmitted to a service provider computer or user device implementing the object identification features described herein. The input can be used by the service provider computer or used device to present a view or an updated view of the stream of content that corresponds to tracking or following the identified object within the camera's field of view. Thereafter, the view from the omnidirectional camera that is presented to the user will include the identified object as the view continually tracks the object in subsequently received frames without the user having to provide further input. In embodiments, the view presented to the user, via a user device, will continue to track the object and present the view of the object (e.g., capture subsequent frames from a corresponding real space within a certain around the camera that is determined by the hardware limitations of the camera) to the user.

A user is able to navigate the view of the content stream captured by the omnidirectional camera by providing minimal input such that the omnidirectional camera or view presented by the omnidirectional camera can follow the identified object or hot spot until the user wishes to view another identified object or the object moves outside of the capabilities of the camera. Conventional viewing and interacting experiences of 360-degree video typically only support panning a number of degrees in one direction or another with no capability to automatically track a particular object of interest within the content captured by the camera. In accordance with at least one embodiment, the object identification feature can provide other enhancements by identifying objects and generating metadata that corresponds to the identified objects. For example, a user may be informed of identified objects within their current view (e.g., the current view that they are being presented from the multiple views captured by the omnidirectional camera) and outside of their current view. In embodiments, the interleaved metadata may be utilized by a client application of a user device, such as a content presentation application, to indicate or inform the user of other identified objects or hot spots that are not in their current selected view but are within view and included in the stream of content that corresponds to the content being captured by the omnidirectional camera.

In accordance with at least one embodiment, input provided by a user may be interpreted by the service provider computers or user device implementing the object identification features to navigate or jump to a completely different omnidirectional camera that is within a certain distance or view of the currently viewed or utilized omnidirectional camera. For example, in a motorsport event, if multiple cars were equipped with omnidirectional cameras that each provide streaming content to the service provider computers, each car and its associated camera would be identified as potential hot spots. A user may provide input to switch views obtained by one camera (one given motorsport with associated camera) to another omnidirectional camera within the same motorsport event. In embodiments, the service provider computers may switch content streams provided by one camera to content streams provided by another camera while still providing object identification and navigation features described herein. As another example, the user device may request content or encoded content from another camera and present an updated view that corresponds to a content stream captured by another camera while still providing the object identification and navigation features described herein. In embodiments, the service provider computers or user device may implement or utilize a number of object detection algorithms, machine learning algorithms, neural networks, or artificial intelligence methods to identify the objects in a frame of content captured by an omnidirectional camera. The objects, once identified by the object detection algorithms, may serve as the presented hot spots or hot spot indicators which users may wish to track by providing input that corresponds to selecting the hot spots.

In accordance with at least one embodiment, the object detection algorithms may generate a score that represents a probability of an object being identified as a particular object within the frame (e.g., one score may correspond to a 75% chance that the object is a soccer ball, another score may correspond to a 35% chance that the object is a rock, etc.). The service provider computers or user device may filter out lower ranking scores and apply other filters such as temporal filters or content type filters. A temporal filter may remove probabilities that are outliers when temporal factors are taken into consideration. For example, a score that indicates a high likelihood of an object being a particular soccer player from one frame to the next when the corresponding location for the soccer player indicates that the soccer player would need to move at an abnormally high speed to move from one location to the next (e.g., a soccer player needing to move over 200 mph to get from one location in a first frame to another location in a second frame) may be removed using the temporal filter. A temporal filter may also be utilized to track an already identified object when certain markers are no longer visible to the capturing camera. For example, in frame A, a soccer player's jersey number may be visible and utilized to identify the particular player. In frame B, the jersey number may no longer be visible or capable of being captured by the omnidirectional camera given the current angle of the player to the camera. The temporal filter can be utilized to help identify this player as the already identified player based on the temporal distance between the frames and the location of the identified object within subsequent frames. A content filter may remove probabilities that are outliers when content or context of the stream of content are taken into consideration. For example, a score that indicates that an object is most likely an elephant when the context of the content is content captured of the sky would be removed using the content filter. For example, the object may be a kite that represents an elephant but it is highly unlikely that the object would be an actual elephant. In embodiments, the service provider computers may select one or more algorithms to aid in identifying objects or other hotspots within frames of content captured by an omnidirectional camera based on a type of content that is being captured. For example, certain detection algorithms may be designed to identify objects in an underwater scenario while other detection algorithms are useful for car races. Applying one of the example algorithms just discussed to the opposite environment or scenario would not produce accurate results or at lease useful results.

The processes and systems described herein represent an improvement on conventional 360-degree video capture and presentation techniques. For example, conventional systems such as standard televisions lack the fine tune controls which would allow a user to easily or efficiently follow or track an object in a given 360-degree video as most systems merely support pan instructions that move a set number of degrees, thereby lacking the granularity required to follow a particular object. Moreover, even if a system could provide such granularity, the time period between a user providing manual input to the processing and instructions transmission to a content distributor may result in unnecessary lag which may ultimately cause the user to miss the hot spot object captured by the omnidirectional camera. In addition, conventional systems lack features to indicate or inform the user about other objects that are being captured by the omnidirectional camera but are currently out of view or not within the viewpoint selected by the user. Further, conventional systems fail to identify objects that are viewed or the ability to track or continually navigate to a particular object of interest as the content is being captured by the omnidirectional camera. The method systems described herein provide for object identification and metadata generation that can be interleaved into captured audio and video portions of a stream of content to provide the above described enhancements and improvements to 360-degree video capture and playback. The systems and methods described herein identify objects, generate metadata about the identified objects, and interleave the metadata into the stream of content while providing minimal delay in the content streaming to the user device process.

FIG. 1 illustrates an example user interface depicting several hot spots for an object identification feature, in accordance with at least one embodiment. FIG. 1 includes user interface 100 which may be presented via a user device such as a television, a computer, a mobile device such as a mobile telephone, or a wearable device such as virtual reality headset. In FIG. 1, the user interface 100 is depicting a view of a soccer field 102 as well as several identified objects 104-110. The view of soccer field 102 represents only a portion of the content or stream of content that is being captured by a 360-degree camera or omnidirectional camera for the soccer game. 360-degree video captured by the 360-degree camera provides the ability for a user to pan or navigate to other views of the soccer match. However, conventional systems may only support a navigation that moves a certain set number of degrees in one direction or the other without the ability to identify or track objects in the soccer match. However, the service provider computers or the user device implementing the object identification features can identify the objects 104-110 and provide indicators and other information about the objects currently being viewed (104 and 106) as well as for objects that are not within the current view (108 and 110).

In embodiments, the user interface 100 includes an indicator for a currently tracked and identified object or hot spot 104. In FIG. 1, the currently tracked hot spot is depicted as a soccer player that is within the current view of the omnidirectional camera. In embodiments, as the soccer player (104) moves about the soccer field 102, instructions would be implemented by the user device presenting the view of the content stream captured by the omnidirectional camera to update the view which would corresponds to following follow the player 104 without the user having to provide additional navigation instructions. The user interface 100 also depicts an additional hot spot or identified object 106 that is depicted in FIG. 1 as another soccer player that is moving the soccer ball within soccer field 102. As illustrated in FIG. 1, the user interface 100 informs the user about the other hot spot (106) and that the user can change the current view of the content stream captured by omnidirectional camera to follow or track this other player (106) as opposed to the currently viewed hot spot or player 104. FIG. 1 also includes indicators for other hot spots or identified objects that were identified by the object identification features implemented by the service provider computers or user device but are not currently in view for the currently presented view 102 of the soccer field but are still being captured by the omnidirectional camera. In embodiments, a user may provide a simple direction input to move from hot spot to hot spot (e.g., move from a view that shows players 104 and 106 to another view that shows hot spot C (108) or hot spot D (110)). In accordance with at least one embodiment, in addition to informing the user about the identified objects (104-110) and navigation to the identified objects (104-110), the object identification features can provide supplemental information obtained from third party computers. For example, the service provider computers or user device may obtain information about the identified object (e.g., jersey number of soccer player 104) and communicate with a fantasy soccer league service to identify that the player 104 is on a user's fantasy team as well as other statistics about the player 104. In another example, if an object is identified as a purchasable item, information about the item such as a price and a link to purchase the item may be provided via a user interface 100 (not pictured).

Figure 2:
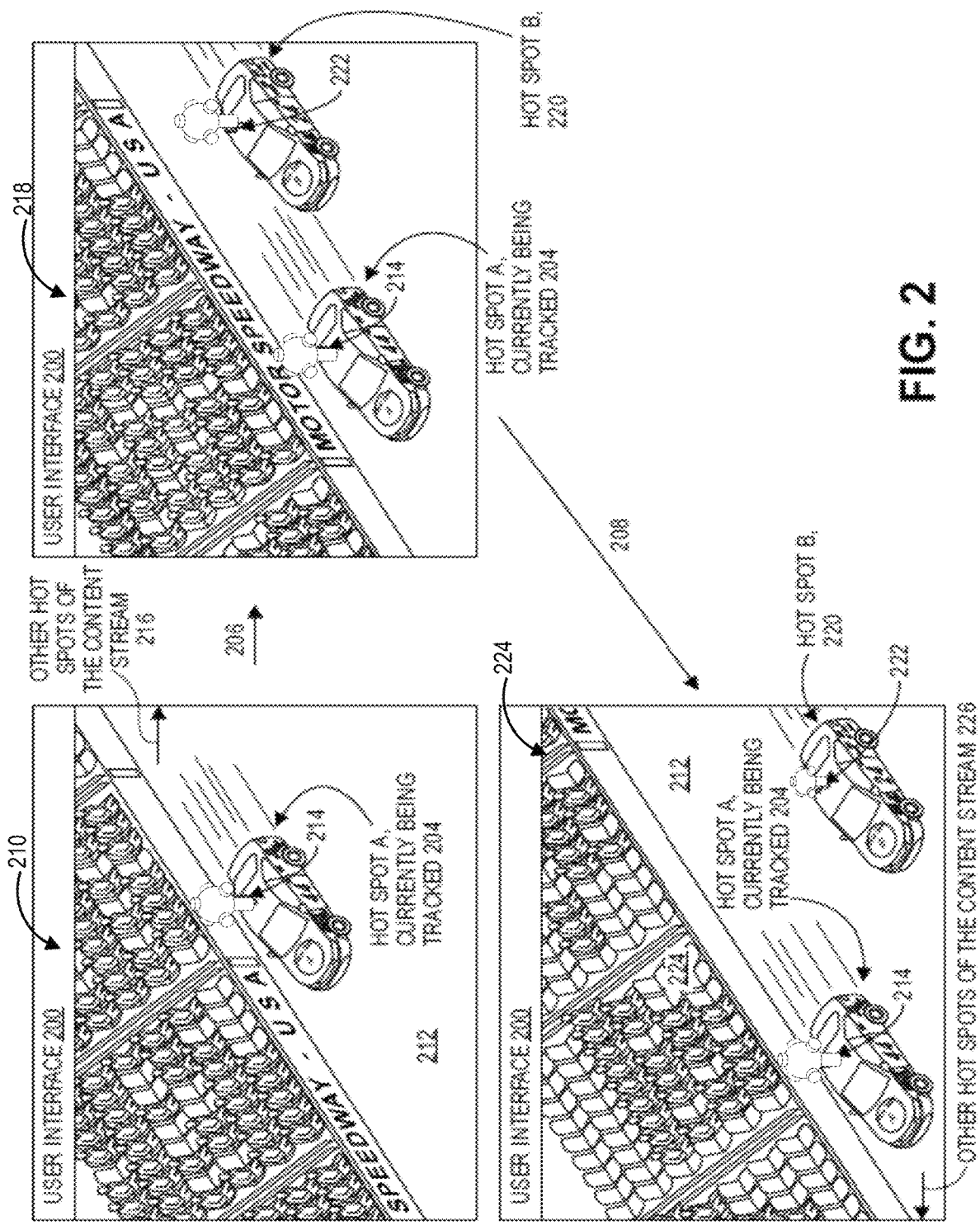
FIG. 2 illustrates a progression of example user interfaces that depict tracking or following a particular hot spot or identified object for an object identification feature, in accordance with at least one embodiment.

FIG. 2 illustrates a progression of example user interfaces that depict tracking or following a particular hot spot or identified object for an object identification feature, in accordance with at least one embodiment. FIG. 2 includes user interface 200 which may be configured to be presented via a television or a user computing device such as a computer, a laptop, or a mobile telephone. The user interface 200 includes representations of objects and scenery captured by a 360-degree camera and depicts a progression of the stream of content as the view of the content captured by a 360-degree camera (not pictured) tracks a particular object through the scene or event (in the illustrated example a motorsport event). The progression of the updated view that is presented via the user device that corresponds to tracking the particular object (204) is indicated by arrows 206 and 208. The user interface 200 includes background scenes or content such as a crowd 210 viewing the motorsport event 212. As described herein, the object identification feature may identify objects in a frame of content, generate metadata that includes information about the object such as an identify of the object, a location of the object in the frame, and time information for the frame, which may be interleaved into a stream of content. The user interface 200 depicts a tracked object such as hot spot A 204 along with an informative message to the viewing user that the hot spot A 204 is currently being tracked by the omnidirectional camera capturing the motorsport event 212.

The motorsport (hot spot A 204) is associated with a 360-degree camera 214. In accordance with at least one embodiment, the user may navigate from a 360-degree camera capturing the event 212 to the 360-degree camera 214 by providing input to the service provider computers, a user device, or an application of either the service provider computers or user device that is implementing the object identification features. In embodiments, the service provider computers or a user device may receive the input and update the view of content provided to the user via user interface 200 to represent a certain view captured by 360-degree camera 214. As discussed above with reference to FIG. 1, user interface 200 also depicts an indicator of other navigable hot spots (216) that are not currently in view of the user viewing user interface 200 but that are being captured by the omnidirectional camera capturing the motorsport event 212. The user interface 200 progression 206 depicts the user interface 200 updating the view being presented of the motorsport event 212 which corresponds to tracking the currently tracked hot spot A (204) as the background scene has been updated with a different portion of the crowd 218. The user interface 200 has been updated to include an identification of an additional hot spot, hot spot B 220 and its associated 360-degree camera 222.

In embodiments, the user may provide input to navigate and track the additional hot spot, hot spot B 220, as it drives through race track event 212 instead of tracking hot spot A 204. As an example, if the user were to provide input indicating a desire to navigate from hot spot A 204 to hot spot B 220, instructions would be implemented by the user device or the service provider computer to update the view of user interface 200 to track and follow hot spot B 220 instead of hot spot A 204. The content stream captured by the omnidirectional camera would still capture information about hot spot A 204 including its location in the race event 212 or within its capabilities but the view presented to the user would follow hot spot B 220. The user interface 200 progression 208 depicts an updated view that corresponds to tracking the currently tracked hot spot A 204 as the background scene has been updated again with a different portion of the crowd 224 within motorsport event 212. The user interface also provides an additional indicator of further hot spots which may correspond to other cars in the motorsport event 212 or other interesting events such as a car crash at 226. A user can interact with their user device to provide input which can update the view presented via the user device of the stream of content captured by the omnidirectional camera to include the other spots 226 which would cause the view presented by user interface 200 to quit following hot spot A 204.

Figure 3:
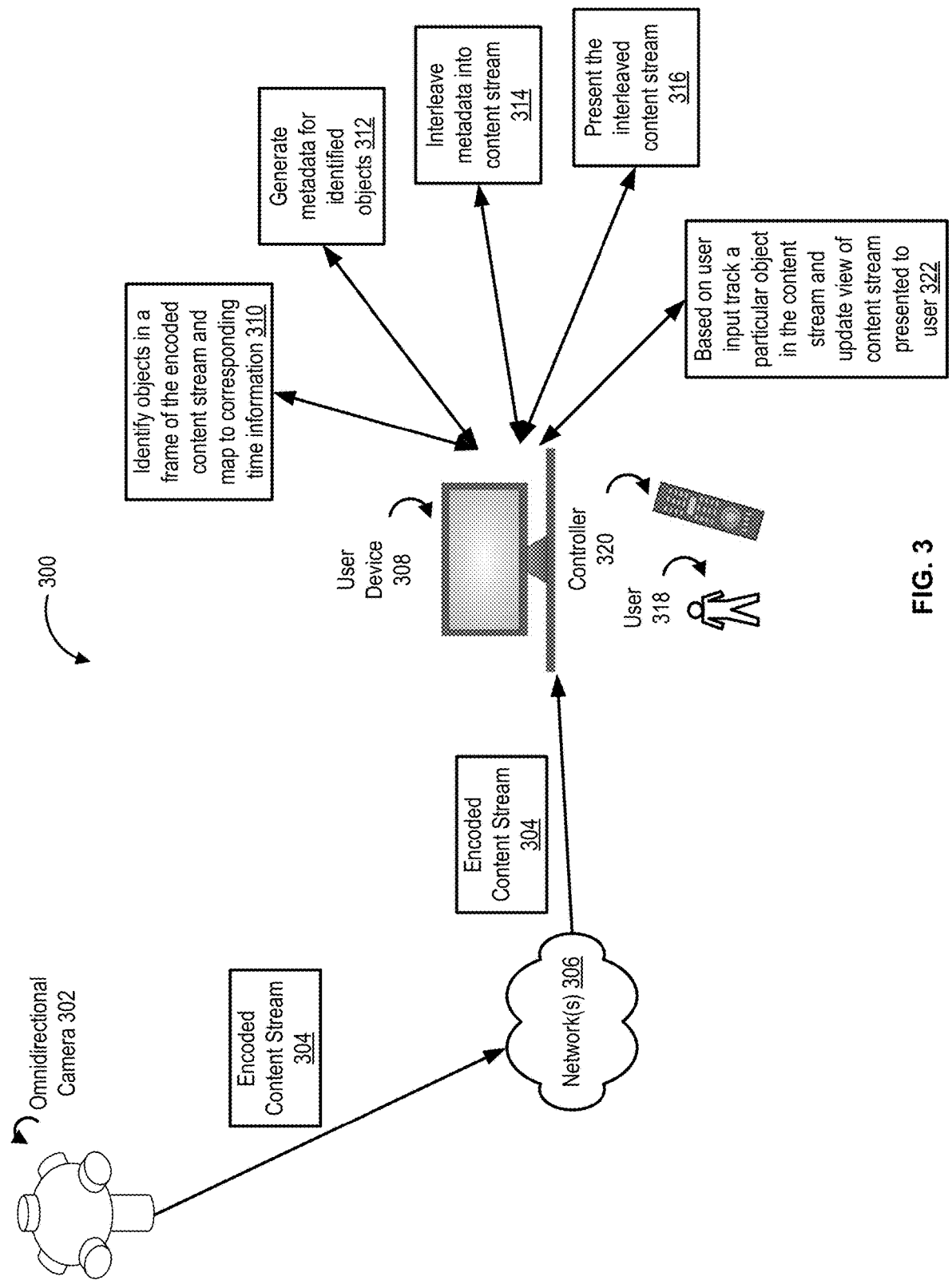
FIG. 3 illustrates an example workflow for an object identification feature, in accordance with at least one embodiment.

FIG. 3 illustrates an example workflow for an object identification feature, in accordance with at least one embodiment. The workflow 300 of FIG. 3 depicts an omnidirectional camera 302 capturing and transmitting an encoded content stream 304 and transmitting the content stream 304, via networks 306, to a user device 308. The workflow 300 depicts user device 308 performing several operations to process the encoded content stream 304 and generate metadata that corresponds to identified objects in the encoded content stream 304 for implementing the object identification features described herein. In some embodiments, the encoded content stream 304 may already be encoded to a low bit rate quality stream prior to being received by the user device 308. The workflow 300 depicts the user device 308 identifying objects in a frame of the encoded content stream 304 and mapping the frame to corresponding time information at 310. In accordance with at least one embodiment, the user device 308 may utilize neural networks and feature-based algorithms to identify objects by using edges, gradients, histograms of oriented gradients, and linear binary patterns to identify the locations and identify of objects included in the frame at 310. In some embodiments, the object identification feature utilizes object detection algorithms that use image recognition or item recognition techniques which compare portions of an image to an image of a known object or item to identify the object.

The workflow 300 includes the user device 308 generating metadata for the identified objects at 312. In embodiments, the metadata may include information about a location of an object in the frame, an identify of the object that corresponds to the location, and the time information that can be used to interleave the metadata into the encoded content stream 304. The user device 308 in workflow 300 may interleave the metadata into the encoded content stream 314 using the time information of the frame that the object was identified within the encoded content stream 304. For example, a certain frame which has an object that is identified as a basketball may be associated with time information. The content stream that included the basketball may also be associated with time information. The user device 308 may be configured to interleave the metadata into the content stream 314 by matching the time information from the frame to the time information for the encoded content stream 304. The workflow 300 may include presenting a view of the interleaved content stream 316 to a user 318 that is associated with user device 308. As described herein, the view of the interleaved content stream 316 that is presented via user device 308 may include indicators of hot spots or identified objects that a user may track or follow in subsequent frames of the encoded content stream 304 received from the omnidirectional camera 302. In embodiments, the user 318 may interact with a device such as controller 320 to provide input which corresponds with an intention to track or follow an identified object in the encoded content stream 304 captured by omnidirectional camera 302. The user device 308 may, in response to receiving or obtaining the user input, update the view presented via user device 308 to continually follow or track the selected object that corresponds to the user input. Thereafter, until new input is received from the user 318, the view will continually update to track or follow the identified object of interest or hot spot that the user 318 is interested in within subsequent frames of the encoded content stream 304. Although FIG. 3 illustrates the user device 308 performing steps 310-316 and 322, in embodiments, a service provider computer implementing the object identification features described herein may perform the same steps or operations. In such embodiments, the user input may be transmitted, via networks 306, to the service provider computer which would cause an update of the view that is presented to the user or a portion of the encoded stream 304 to be transmitted from the service provider computer and to the user device 308 as described below in FIG. 4.

Figure 4:
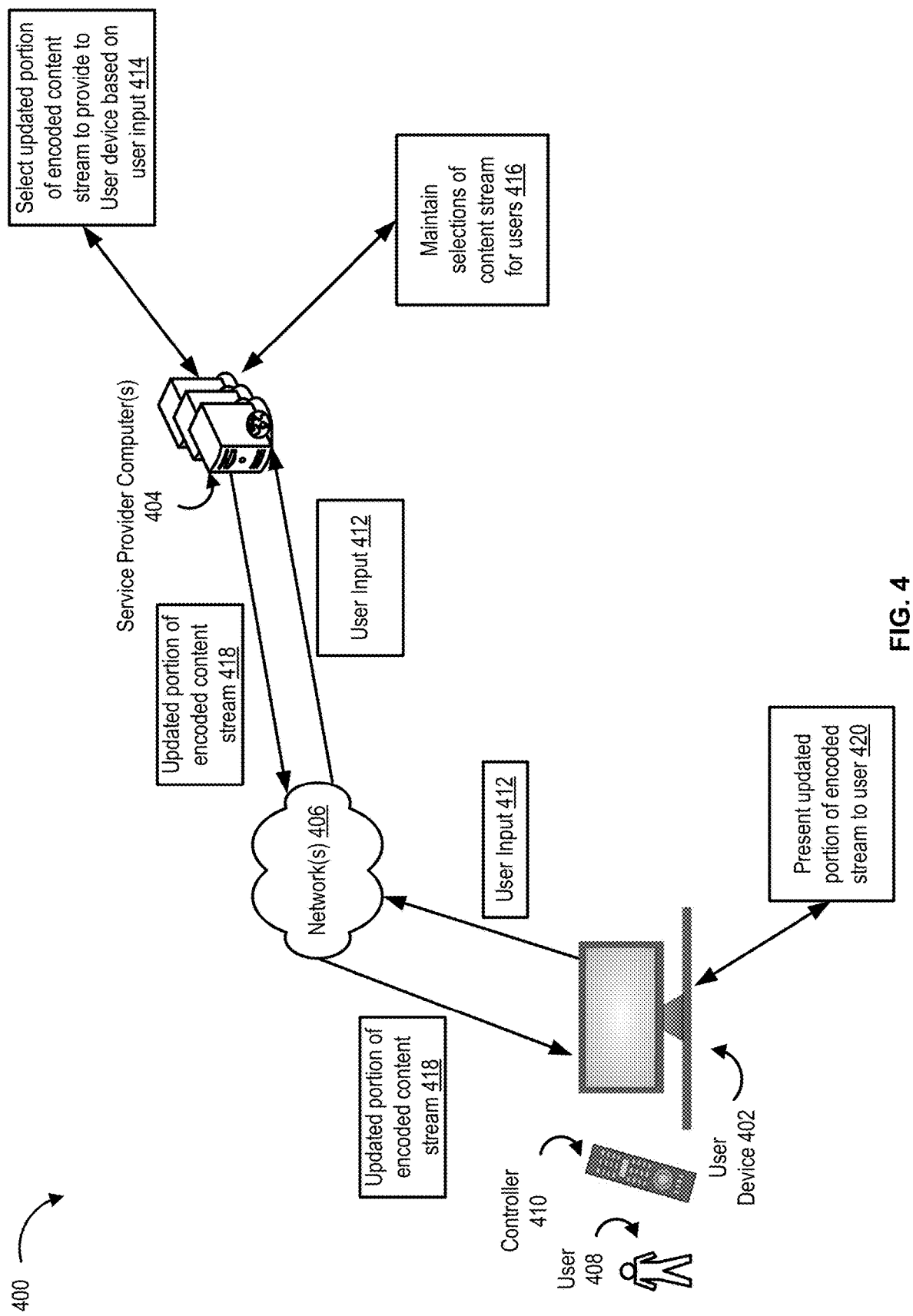
FIG. 4 illustrates an example workflow for an object identification feature, in accordance with at least one embodiment.

FIG. 4 illustrates an example workflow for an object identification feature, in accordance with at least one embodiment. The workflow 400 depicts a configuration of devices, user device 402, service provider computers 404, for implementing an object identification feature. In such a configuration of devices the encoded stream of content (e.g., 304) captured by an omnidirectional camera is transmitted to service provider computers 404 for processing and further transmittal to the user device 402. In the configuration described with reference to FIG. 4, the service provider computers 404 may perform the operations of identifying objects in a frame of the encoded content stream and mapping the object to corresponding time information (310), generating metadata for the identified objects (312), and interleaving the metadata into the content stream (314) described in FIG. 3. In such embodiments, the service provider computers 404 may select a portion of the interleaved content stream to provide or transmit to user device 402 via networks 406 to conserve bandwidth. For example, the service provider computers 404 may utilize rectangular mapping to map a representation of the content captured by an omnidirectional camera to a rectangle. A portion of the mapped content may then be transmitted to the user device 402 for viewing by the user 408. In some embodiments, cubic mapping may be utilized by the service provider computers 402 for mapping the encoded content stream to a cube geometric shape in which a portion of the cube is selected for transmission to the user device 402. Whichever portion of the content that is transmitted by the service provider computers 404 to the user device 402 for presentation to the user 408, the object identification features may still indicate hot spots for the user to navigate to and track similar to the process described for FIG. 3.

In workflow 400 upon the user 408 viewing the portion of content that includes identified objects or hot spots, the user 408 may utilize a controller 410 to provide user input 412, via networks 406, to the service provider computers 404. The user input 412 may correspond to tracking an identified object within the current view of the content stream that is being presented by user device 402 or an identified object that is not within the current view of the content stream. The service provider computers 404 may select an updated portion of the encoded content stream to provide 414 to the user device 402 based on the user input 412. For example, if the user input 412 corresponds to an identified object that is within the current view, then the previously selected portion of content may still be provided to the user device 402. However, if the user input 412 corresponds to an identified object that is not within the current view being presented by user device 402, then the service provider computers 404 may select an updated portion of the encoded content stream 414 to provide to the user device 402 via networks 406 such that the updated view presented to the user 408 includes the intended object of interest. The workflow 400 includes the service provider computers 404 maintaining selections of objects for the content stream at 416. In embodiments, when new users start viewing the content the service provider computers 404 may present a portion of the encoded stream to present based on aggregate selections made by other users viewing the same content. The aggregate selections made by other users may correspond to selections of identified objects or hot spots within the stream of content which may more heavily bias the portions of content that are selected and provided to multiple user devices. As described herein, the portions of content that are selected and provided to the user devices may be updated based on users providing input to track other objects which would necessitate presenting an updated view of the content to correspond to tracking or following the object. The workflow 400 may include service provider computers 404 transmitting the updated portion of the encoded content stream 418, via networks 406, to the user device 402. The workflow 400 depicts the user device 402 presenting the updated portion of the encoded content stream to the user at 420.

Figure 5:
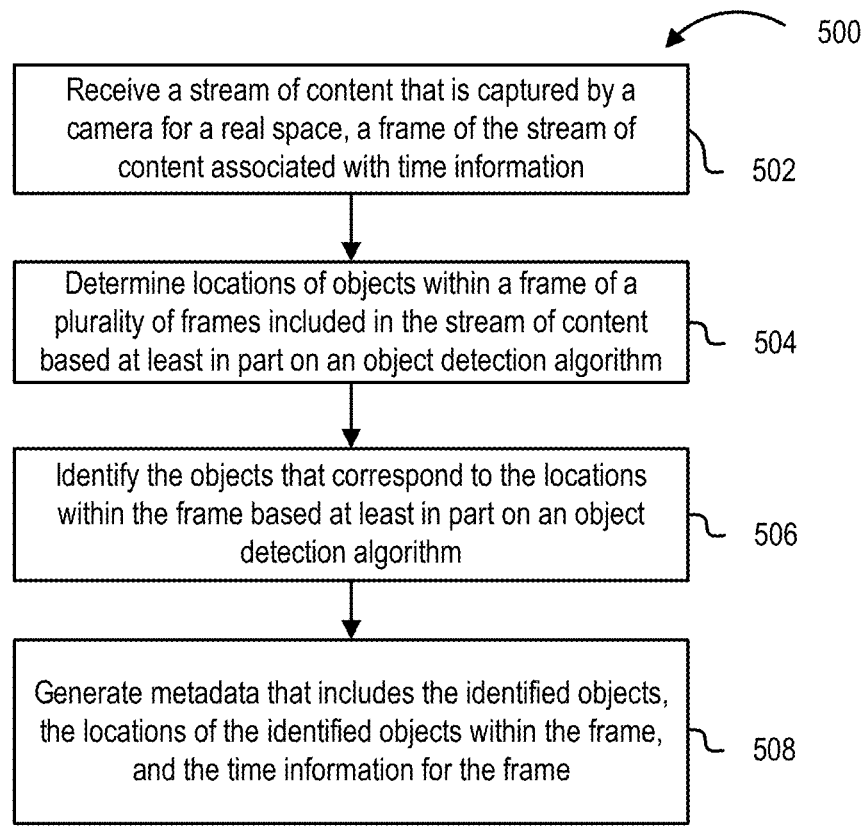
FIG. 5 illustrates a flow chart for an object identification feature, in accordance with at least one embodiment.
Figure 6:
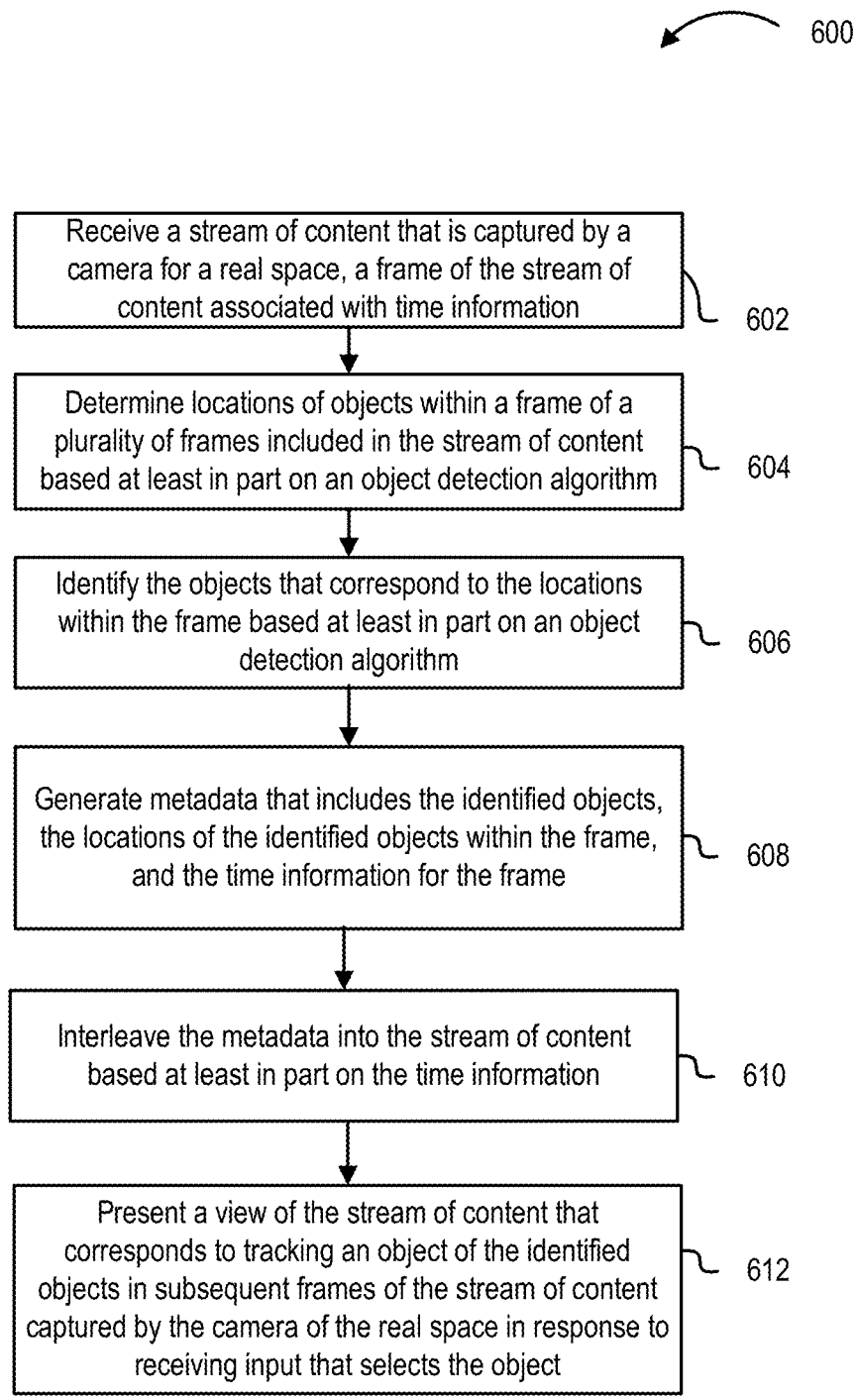
FIG. 6 illustrates a flow chart for an object identification feature, in accordance with at least one embodiment.

FIGS. 5 and 6 illustrate example flow charts for object identification features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 7:
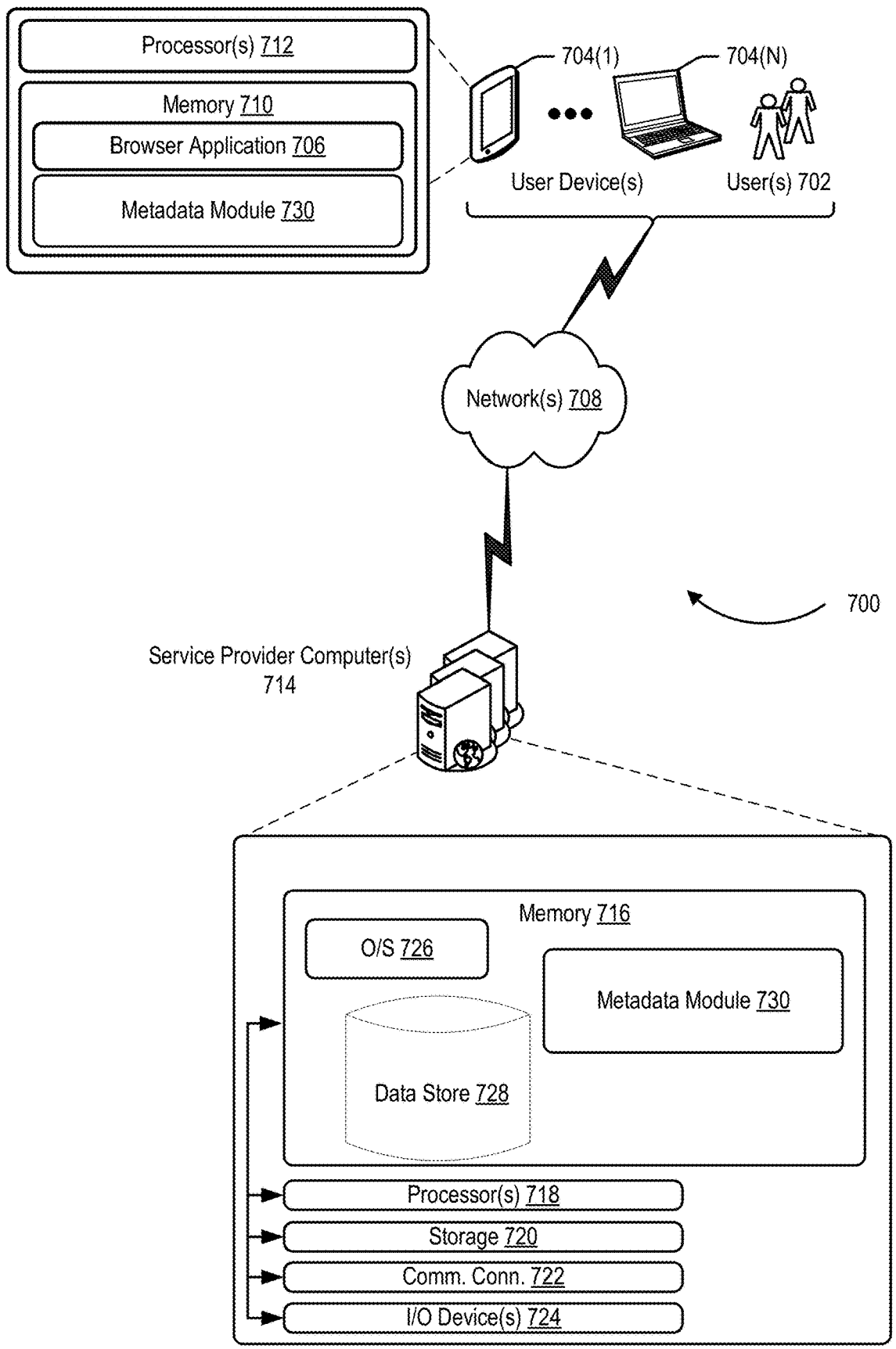
FIG. 7 illustrates an example architecture for implementing an object identification feature as described herein that includes one or more service provider computers and/or a user device(s) connected via one or more networks, in accordance with at least one embodiment.

In some examples, service provider computers (service provider computers 404 and 714) and/or user devices (user device 308 and 704) utilizing at least the metadata module 730 depicted in FIGS. 3, 4, and 7 may perform the processes 500 and 600 of FIGS. 5 and 6. In FIG. 5, the process 500 may include receiving a stream of content that is captured by a camera for a real space at 502. In embodiments, a frame of the stream of content is associated with time information and includes video information and audio information that is captured by a camera. In embodiments, the camera may include an omnidirectional camera or 360-degree camera, a single camera with multiple lenses, multiple cameras that capture content which is later stitched together to form a 360-degree video, or other suitable technology for capturing 360-degree video. In accordance with at least one embodiment, the stream of content may be encoded or parsed into one or more quality bit rate streams of content. The service provider computers or user devices receiving the encoded quality bit rate streams of content may identify or select a particular quality bit rate stream, usually the lowest bit rate stream of content, for further object identification via features described herein. In embodiments, the stream of content may already be encoded or parsed into multiple quality bit rate streams of content prior to being transmitted to the service provider computers or user devices.

The process 500 may include determining locations of objects within a frame of a plurality of frames included in the stream of content based at least in part on an object detection algorithm at 504. In embodiments, each frame may include or be associated with corresponding time information which can be used to filter or parse out certain probabilities associated with identified objects using a temporal filter as well as used to interleave or combine the generated metadata back into the stream of content for later use by a user. The process 500 may include identifying the objects that correspond to the locations within the frame based at least in part on the object detection algorithm at 506. In embodiments, the object detection algorithm may utilize an image comparison further using an item catalog, an identifier or reference number referral knowledge base, or other image comparison to object detection algorithm techniques known to one of skill in the art. In embodiments, the process 500 may conclude at 508 by generating metadata that includes the identified objects, the locations of the identified objects within the frame, and the time information for the frame.

As described herein, the service provider computers or user devices may interleave the metadata into the stream of content by interleaving the metadata with the audio information and video information at appropriate times based on the corresponding time information for each frame of content that was processed by the service provider computer or user devices implementing the object identification features. In embodiments, the service provider computers or user devices may present the interleaved stream of content to the user. The user may be informed, via various indicators of the presented content, of identified objects or hot spots that the user may navigate to utilizing the native controls of a television controller or other input/output devices which would cause the view of the interleaved stream of content to be continually updated to track or follow the identified object until the object is out of view or the user provides further input (e.g., indicates they want to follow a different identified object in the stream of content). Once an particular object has been identified by a user as of interest or a hot spot within a stream of content, the service provider computers or user devices will continue to process incoming streams of content and attempt to identify the particular object as well as other objects within subsequently received frames captured by the omnidirectional camera of the real space or scene associated with the stream of content. In embodiments, the service provider computers or user devices may select a particular algorithm or implement multiple algorithms for analyzing the received stream of content such that other features may be provided to a user. For example, an close captioning feature of the real-time content captured by an omnidirectional camera may be provided by applying a speech to text algorithm that is then converted into metadata similarly or in addition to the identified objects within a frame.

The process 600 may begin by receiving a stream of content that is captured by a camera for a real space where a frame of the stream of content is associated with time information at 602. The process 600 may include determining locations of objects within a frame of a plurality of frames included in the stream of content at 604. Each frame of the plurality of frames may be associated with corresponding time information that indicates a time that the content was captured. The time information, in embodiments, may correspond to a local time zone clock or an internal clock of the omnidirectional camera or can be received from an external source. The process 600 may include identifying the objects that correspond to the locations within the frame based at least in part on an object detection algorithm at 606. In embodiments, the service provider computers or user devices implementing the object identification features described herein may select a particular algorithm or a set of algorithms to apply to the received stream of content based on a type of content being captured by the omnidirectional camera. For example, a particular object identification algorithm used for soccer games would not be applicable to a bungie jumping event and vice versa.

The process 600 may include generating metadata that includes the identified objects, the locations of the identified objects within the frame, and the time information for the frame at 608. The process 600 may include interleaving the metadata with the video information and the audio information of the stream of content based at least in part on the time information at 610 or interleaving the metadata into the stream of content based on the time information. The process 600 may conclude at 612 by presenting a view of the stream of content that corresponds to tracking an object of the identified objects in subsequent frames of the stream of content captured by the camera of the real space in response to receiving input that selects the object. As described herein, the service provider computers or user devices may interpret the metadata to provide additional features such as close captioning, extra information associated with particular objects obtained from other information sources (third party computers) such as personal information for sports players, teams, or locations included in the stream of content. In accordance with at least one embodiment, the object detection algorithms may generate a score for each identified object within a frame that represents a probability of the object being a particular object (e.g., a rock as opposed to a human soccer player, or a kite as opposed to a bird in the sky). In embodiments, the service provider computers or user devices may rank the probabilities and apply one or more policies or filters which remove the lowest ranking scores and also remove probabilities of objects based on a temporal filter or content filter. For example, a temporal filter may remove a probability score of a particular football player being in two separate locations of a field that would violate a temporal policy that indicates that players cannot travel fast enough to be at both locations at relatively the same time. A content filter may, for example, remove probabilities associated with foreign objects such as street signs in the middle of a football field.

FIG. 7 illustrates an example architecture for implementing an object identification feature as described herein that includes one or more service provider computers and/or a user device(s) connected via one or more networks, in accordance with at least one embodiment. In architecture 700, one or more users 702 (e.g., customers, users, consumers, etc.,) may utilize user computing devices 704(1)-(N) (collectively, user devices 704) to access a browser application 706 or a user interface (UI) accessible through the browser application 706 or user device 704, via one or more networks 708 to request content including media content, streaming content, audio content, video content, or online marketplaces and electronic marketplaces. In embodiments, the one or more users 702 may utilize user computing devices 704(1)-(N) to access the browser application 706 or a UI accessible through the browser application 706 or that is presented via user computing devices 704(1)-(N), via one or more networks 708, to request content including media content electronic catalogs, online marketplaces, or electronic marketplaces from a third party computer (not pictured). The "browser application" 706 can be any browser control or native application that can access and display a network page or other information such as a user interface of a native software application for providing requesting and receiving content such as a stream of content that includes interleaved metadata for identifying objects or hot spots that the user may track via an omnidirectional camera that is capturing the content or stream of content according to the object identification feature described herein. A native software application may include an application or program that has been developed for use on a particular platform (such as an operating system) or a particular device (such as a particular type of mobile device or user device 704). In embodiments, the user device 704 may include one or more components for enabling the user 702 to interact with the browser application 706 or other presented user interface such as input/output devices (e.g., a controller).

The user devices 704 may include at least one memory 710 and one or more processing units or processor(s) 712. The memory 710 may store program instructions that are loadable and executable on the processor(s) 712, as well as data generated during the execution of these programs. Depending on the configuration and type of the user devices 704, the memory 710 may be volatile (such as random access memory (RAM)) and/or non-volatile (such as read-only memory (ROM), flash memory, etc.). The user devices 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 704. In some implementations, the memory 710 may include multiple different types of memory, such as static random access memory (SRAM), dynamic random access memory (DRAM), or ROM.

Turning to the contents of the memory 710 in more detail, the memory 710 may include an operating system and one or more application programs or services for implementing the features disclosed herein. Additionally, the memory 710 may include one or more modules for implementing the features described herein including the metadata module 730.

The architecture 700 may also include one or more service provider computers 714 that may, in some examples, provide computing resources such as, but not limited to, client entities, low latency data storage, durable data store, data access, management, virtualization, hosted computing environment or "cloud-based" solutions, electronic content performance management, media streaming services, content generation, etc. The service provider computers 714 may implement or be an example of the service provider computer(s) described herein with reference to FIGS. 1-6 and throughout the disclosure. The one or more service provider computers 714 may also be operable to provide site hosting, media streaming services, computer application development, and/or implementation platforms, combinations of the foregoing, or the like to the one or more users 702 via user devices 704.

In some examples, the networks 708 may include any one or a combination of many different types of networks, such as cable networks, the Internet, wireless networks, cellular networks, and other private and/or public networks. While the illustrated examples represents the users 702 communicating with the service provider computers 714 over the networks 708, the described techniques may equally apply in instances where the users 702 interact with the one or more service provider computers 714 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 714 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 714 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 714 may be in communication with the user device 704 via the networks 708, or via other network connections. The one or more service provider computers 714 may include one or more servers, perhaps arranged in a cluster or as individual servers not associated with one another.

In one illustrative configuration, the one or more service provider computers 714 may include at least one memory 716 and one or more processing units or processor(s) 718. The processor(s) 718 may be implemented as appropriate in hardware, computer-executable instructions, firmware, or combination thereof. Computer-executable instruction or firmware implementations of the processor(s) 718 may include computer-executable or machine-executable instructions written in any suitable programming language to perform the various functions described when executed by a hardware computing device, such as a processor. The memory 716 may store program instructions that are loadable and executable on the processor(s) 718, as well as data generated during the execution of these programs. Depending on the configuration and type of the one or more service provider computers 714, the memory 716 may be volatile (such as RAM) and/or non-volatile (such as ROM, flash memory, etc.). The one or more service provider computers 714 or servers may also include additional storage 720, which may include removable storage and/or non-removable storage. The additional storage 720 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 716 may include multiple different types of memory, such as SRAM, DRAM, or ROM.

The memory 716, the additional storage 720, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 716 and the additional storage 720 are all examples of non-transitory computer storage media. Additional types of non-transitory computer storage media that may be present in the one or more service provider computers 714 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 714. Combinations of any of the above should also be included within the scope of non-transitory computer-readable media.

The one or more service provider computers 714 may also contain communication connection interface(s) 722 that allow the one or more service provider computers 714 to communicate with a data store, another computing device or server, user terminals, and/or other devices on the networks 708. The one or more service provider computers 714 may also include I/O device(s) 724, such as a keyboard, a mouse, a pen, a voice input device, a touch input device, a display, speakers, a printer, etc.

Turning to the contents of the memory 716 in more detail, the memory 716 may include an operating system 726, one or more data stores 728, and/or one or more application programs or services for implementing the features disclosed herein including the metadata module 730. In accordance with at least one embodiment, the metadata module 730 may be configured to at least parse input that corresponds to a query into labels or terms, identify a context of the input or query, and identify a node in an ontological structure such as a browse node structure of items or item categories maintained by an electronic marketplace to map the input to and identify one or more refinements of the node. In embodiments, the refinement module 730 may be configured to encode received streams of content into one or more bit rate quality streams of content, select a particular bit rate quality stream of content, apply an object identification algorithm or other artificial intelligence algorithm, to the stream of content to identify objects within the stream of content. Corresponding time information for each frame of the stream of content may be obtained for each identified object as well as a location of the object within each frame. In embodiments, the metadata module 730 may be configured to generate metadata that includes the identified objects, locations of the objects within a frame of the received stream of content, and interleave the metadata into the stream of content using the time information for each frame. The metadata module 730 may be configured to provide instructions, via networks 708 to one or more omnidirectional cameras to track or follow in a real space a particular identified object based on receiving input via a user 702 interacting with a user device 704.

Figure 8:
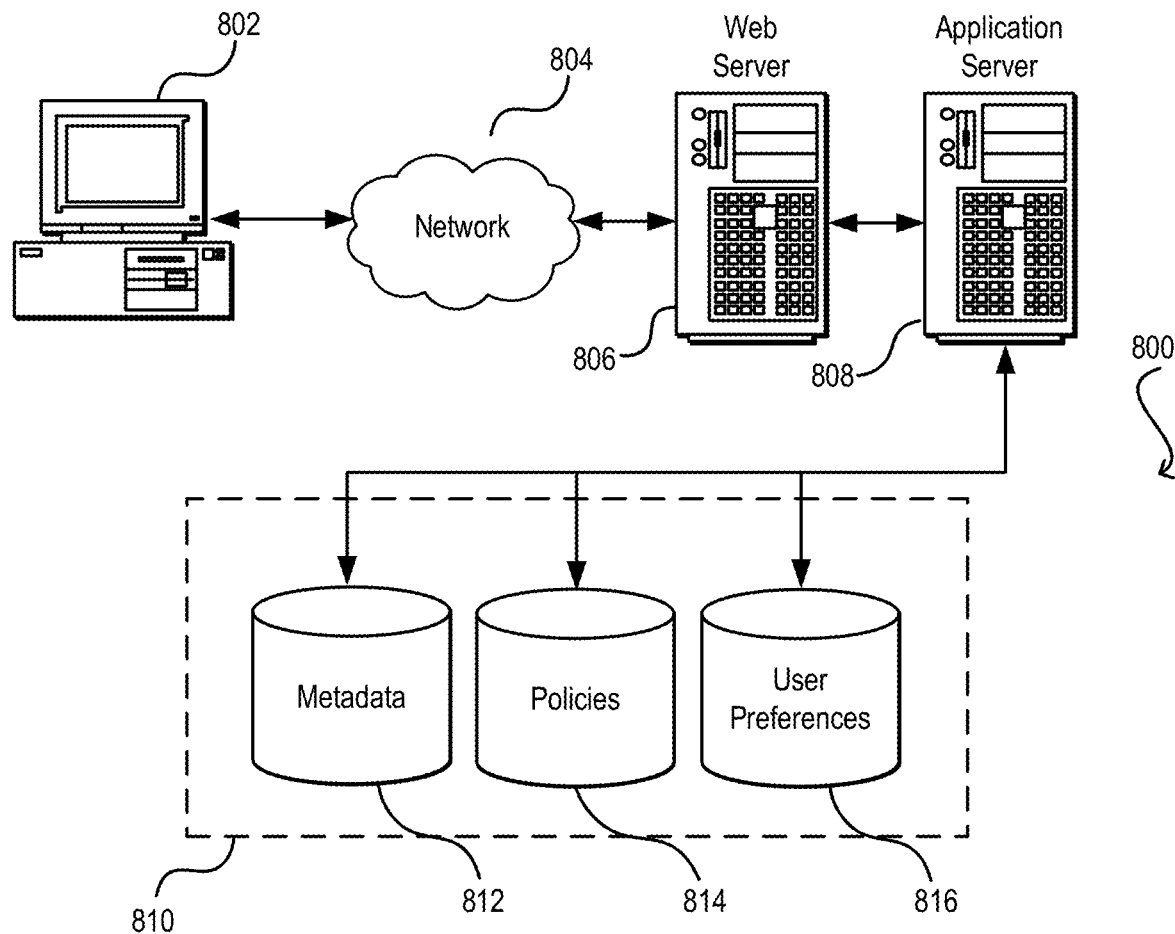
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing metadata 812 and user preferences 816, which can be used to serve content for the production side, interleave the generated metadata stored in 812 into a stream of content, and transmit the interleaved content to a user device enabling the user to navigate between hot spots or identified objects. The data store also is shown to include a mechanism for storing policies 814, which can be used for filtering probability scores of an algorithm for identifying objects in a stream of content or are associated with a type of content (e.g., sports game versus nature hike). It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java °, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, by a computer system, an encoded stream of content captured by an omnidirectional camera device of a real space, the encoded stream of content including one or more bit rate quality streams;
    identifying, by the computer system, a particular quality bit rate stream from the one or more bit rate quality streams, a frame of the particular quality bit rate stream associated with corresponding time information;
    identifying, by the computer system using an artificial intelligence algorithm, one or more objects in a particular frame of the particular quality bit rate stream;
    generating, by the computer system, metadata that includes the identified one or more objects and time information for the particular frame;
    interleaving, by the computer system, the metadata into the one or more bit rate quality streams based at least in part on the time information;
    presenting, by the computer system, a particular bit rate quality stream of the one or more bit rate quality streams that includes an indication of the identified one or more objects; and
    updating, by the computer system, the presentation of the particular bit rate quality stream in response to receiving input, the updating of the presentation including tracking an object of the identified one or more objects in subsequent frames of the encoded stream of content captured by the omnidirectional camera device of the real space.

2. The computer-implemented method of claim 1, wherein identifying the one or more objects in the particular frame includes selecting a particular artificial intelligence algorithm from a plurality of artificial intelligence algorithms based at least in part of a type of the encoded stream of content.

3. The computer-implemented method of claim 2, wherein identifying the one or more objects in the particular frame includes generating a score that represents a probability of a type of the object identified by the particular artificial intelligence algorithm.

4. The computer-implemented method of claim 3, further comprising ranking scores for the one or more objects.

5. The computer-implemented method of claim 4, wherein generating the metadata includes selecting a subset of the ranked one or more objects based at least in part on the type of the encoded stream of content.

6. A non-transitory computer-readable storage medium storing computer-executable instructions that, when executed by a computer system, configure the computer system to perform operations comprising:
receiving a stream of content that is captured by a camera for a real space, a frame of the stream of content associated with time information;
determining locations of objects within a particular frame of a plurality of frames included in the stream of content based at least in part on an object detection algorithm;
identifying the objects that correspond to the locations within the particular frame based at least in part on the object detection algorithm;
generating metadata that includes the identified objects, the locations of the identified objects within the particular frame, and the time information for the particular frame;
interleaving the metadata into the stream of content based at least in part on the time information; and
presenting a view of the stream of content that corresponds to tracking an object of the identified objects in subsequent frames of the stream of content captured by the camera of the real space in response to receiving input that selects the object.

7. The non-transitory computer-readable storage medium of claim 6, wherein the operations further comprise interleaving the metadata with one or more bit rate quality streams of the stream of content based at least in part on the time information.

8. The non-transitory computer-readable storage medium of claim 7, wherein the operations further comprise presenting information that indicates the identified objects within the interleaved stream of content.

9. The non-transitory computer-readable storage medium of claim 8, wherein presenting the view of the stream of content that corresponds to tracking the object in the real space includes instructions to continually update the view.

10. The non-transitory computer-readable storage medium of claim 9, wherein the operations further comprise presenting an updated view of the stream of content that includes a different view of the real space and is captured by a different camera based at least in part on updated input.

11. The non-transitory computer-readable storage medium of claim 8, wherein the information includes a text description including the identification of the object.

12. The non-transitory computer-readable storage medium of claim 6, wherein the stream of content includes content captured by one or more cameras that are interleaved into a single stream of content.

13. The non-transitory computer-readable storage medium of claim 6, wherein the operations further comprise:
identifying one or more audible sounds within the particular frame based at least in part on a speech to text algorithm; and
generating close captioning information for the particular frame based at least in part on the one or more audible sounds.

14. A computer system comprising:
a memory configured to store computer-executable instructions; and
a processor in communication with the memory configured to execute the computer-executable instructions to at least:
receive a stream of content that is captured by a camera for a real space, a frame of the stream of content associated with time information;
determine locations of objects within a particular frame of a plurality of frames included in the stream of content based at least in part on an object detection algorithm;
identify the objects that correspond to the locations within the particular frame based at least in part on the object detection algorithm;
generate metadata that includes the identified objects, the locations of the identified objects within the particular frame, and the time information for the particular frame;
interleave the metadata into the stream of content based at least in part on the time information; and
present a view of the stream of content that corresponds to tracking an object of the identified objects in subsequent frames of the stream of content captured by the camera of the real space in response to receiving input that selects the object.

15. The computer system of claim 14, wherein identifying the objects includes generating probability scores that represents a likelihood of a type of object corresponding to an identified object of the identified objects.

16. The computer system of claim 15, wherein the processor is further configured to implement a policy for filtering the probability scores based at least in part on the time information.

17. The computer system of claim 15, wherein the processor is further configured to implement a policy for filtering the probability scores based at least in part on a type of the stream of content.

18. The computer system of claim 14, wherein the processor is further configured to receive, from a proxy server computer, a portion of the stream of content, the proxy server computer configured to transmit the portion of the stream of content based on aggregate user input that indicates selections of tracking objects of the identified objects in the stream of content.

19. The computer system of claim 14, wherein the processor is further configured to:
obtain, from a third party computer, third party information associated with a user; and map the identified objects to the third party information for presentation to a user device associated with a user viewing the interleaved stream of content.

20. The computer system of claim 14, wherein the processor is further configured to:
present the stream of content with the interleaved metadata to a user interface of the user device;
generate indicators that correspond to the identified objects in the stream of content; and
transmit the indicators that are configured to update presentation of the stream of content.

* * * * *